US010206323B2

(12) United States Patent
Desai et al.

(10) Patent No.: US 10,206,323 B2
(45) Date of Patent: Feb. 19, 2019

(54) PLANT BY PLANT HARVESTER

(71) Applicants: Pinakin Desai, Naperville, IL (US); Stephen M. Faivre, Naperville, IL (US); Peter Joseph Zerillo, Naperville, IL (US); Lee C. Prunty, Naperville, IL (US); William M. Hoeg, Naperville, IL (US)

(72) Inventors: Pinakin Desai, Naperville, IL (US); Stephen M. Faivre, Naperville, IL (US); Peter Joseph Zerillo, Naperville, IL (US); Lee C. Prunty, Naperville, IL (US); William M. Hoeg, Naperville, IL (US)

(73) Assignee: MEMES ASSOCIATES, LTD, Naperville, IL (US)

( * ) Notice: Subject to any disclaimer, the term of this patent is extended or adjusted under 35 U.S.C. 154(b) by 56 days.

(21) Appl. No.: 15/472,153

(22) Filed: Mar. 28, 2017

(65) Prior Publication Data
US 2017/0280620 A1 Oct. 5, 2017

Related U.S. Application Data

(60) Provisional application No. 62/314,576, filed on Mar. 29, 2016.

(51) Int. Cl.
*A01B 69/00* (2006.01)
*A01D 41/127* (2006.01)
*A01D 45/02* (2006.01)

(52) U.S. Cl.
CPC ............ *A01B 69/00* (2013.01); *A01D 41/127* (2013.01); *A01D 45/021* (2013.01)

(58) Field of Classification Search
CPC ...... A01D 45/021; A01D 46/30; A01D 57/22; A01D 34/008; A01D 63/00
USPC .......................................... 56/10.2 F
See application file for complete search history.

(56) References Cited

U.S. PATENT DOCUMENTS 4,726,175 A * 2/1988 Day, V ................... A01B 69/00
                                                     172/5
5,782,072 A * 7/1998 Matthews ........... A01D 41/1278
                                                     56/10.2 F
7,628,235 B2 * 12/2009 Satzler ................... B62D 55/30
                                                     180/9.1

(Continued)

FOREIGN PATENT DOCUMENTS

FR          2192443       *    8/1974

*Primary Examiner* — Arpad Fabian-Kovacs
(74) *Attorney, Agent, or Firm* — Justin Lampel

(57) ABSTRACT

A plant by plant harvester is provided. The harvester may harvest and analyze single or double rows of crops. The single row harvester may have a first and a second guide unit which surrounds a single row of a crop and directs the single row of the crop into a sheller, picker, or grain/fruit separation unit. In an alternative embodiment of the device, the device may harvest two rows of crops. A GPS or any other location positioning device having an antenna is secured to the top of the main frame and allows the harvester to be remotely controlled. A hopper, container or holding bin may, in real-time, calculate the weight of the separated products. A plurality of sensors may be located on or near the first and/or second guide unit which allows the harvester to, for example, capture data related to the crop at the single plant level.

8 Claims, 4 Drawing Sheets

(56) References Cited

U.S. PATENT DOCUMENTS

| | | | |
|---:|:---:|:---|:---|
| 8,028,506 B1* | 10/2011 | Casper | A01D 46/081 |
| | | | 172/5 |
| 9,603,300 B2* | 3/2017 | Pettersson | A01D 34/008 |
| 9,848,532 B2* | 12/2017 | Keski-Luopa | A01D 43/14 |
| 2006/0277885 A1* | 12/2006 | Rauch | A01D 43/082 |
| | | | 56/94 |
| 2008/0028735 A1* | 2/2008 | Janning | A01D 41/14 |
| | | | 56/10.1 |
| 2009/0037059 A1* | 2/2009 | Huster | A01B 69/001 |
| | | | 701/50 |
| 2017/0339827 A1* | 11/2017 | Anderson | A01D 41/06 |

* cited by examiner

PLANT BY PLANT HARVESTER

CROSS-REFERENCE TO RELATED APPLICATIONS

The following application is based on and claims the priority benefit of U.S. provisional application Ser. No. 62/314,576 filed Mar. 29, 2016; the entire contents of which are incorporated by reference.

BACKGROUND OF THE INVENTION

A plant by plant harvester is provided. Depending on the use, the device may also be called a 'plant by plant small plot harvester'. The harvester may be an autonomous device capable of harvesting and analyzing single or double rows of crop spaced as narrow as six inches apart. Further, the harvester may harvest cops as close as one inch apart within the same row. The autonomous single or double row harvester has a main frame supported by a plurality of wheels and/or tracks. The single row harvester may have a first and a second guide unit which surrounds a single row of a crop and directs the single row of the crop into a sheller, picker, or grain/fruit separation unit. In an alternative embodiment of the device, the device may harvest two rows of crops at the same time. In that embodiment, the harvester has a third guide unit. A GPS or any other location positioning device having an antenna is secured to the top of the main frame and allows the harvester to be remotely controlled. As part of the separation process, a hopper, container or holding bin may, in real-time, calculate the weight of the separated products. A plurality of sensors may be located on or near the first and/or second guide unit which allows the harvester to, for example, capture data related to the crop at the single plant level. Further, the autonomous single or double row plot harvester may gauge the strain of the crop and sense cob or grain/seed/fruit separation release pressure.

Over the years, attempts have been made to provide a harvester which can accurately harvest a single row of crops. For example, U.S. Pat. No. 5,423,166 to Scott discloses a single head grape and raisin harvester having a single driven oscillating shaker head mounted on a sub-frame enabling the shaker head to center itself on the row of grape vines being harvested. The single row harvester is also provided with a stretchable conveyor belt mounted on interconnected plastic chain links for reliably transporting grapes or raisins to an elongated discharge conveyor which is positioned transversely when collecting and discharging grapes from the harvester into trucks or boxes and is pivoted parallel to the longitudinal axis of the vehicle when moving along roadways.

Further, U.S. Pat. No. 4,662,162 to Bettencourt discloses a single-row tomato harvester. A tractor fully supported on its own wheels, has its wheels being spaced apart sufficiently to bridge a previously harvested bed and ride in its furrows. The tractor has its own hydraulic pump, a power take-off unit along the tractor's longitudinal centerline, and a rigid draw bar at its rear. A harvester assembly having no motive power is partially supported on wheels spaced apart widthwise at substantially the same distance as those of the tractor and has a series of hydraulically powered means. The harvester is offset by one bed from the tractor during harvesting. A tongue pivotally attached at one end to the harvester and the other end to said tractor, supports a hydraulic pump for operating the harvester's series of powered means. A longitudinally rigid drive line, swivel mounted to said pump's rotary shaft and to the tractor's power take-off unit, has telescoping means for automatically lengthening and shortening it. The drive line lies along the centerline of the tractor during the offset harvesting. A hydraulically powered generally horizontal cylinder-piston apparatus is pivotally attached at one end to said tongue and at the other end to the harvester for shifting the relative lateral position of the harvester assembly to the tractor.

Still further, U.S. Pat. No. 5,170,614 to Williamson discloses a harvester adapted for harvesting low-lying fruit, such as typical with high-density, dwarf trees, includes an intra-loop conveyor for collecting detached fruit relatively close to the ground and elevating same with a single flighted belt. The harvester straddles a single row of the trees and detaches the fruit therefrom by repeatedly impacting the tree canopies are the harvester moves along the row. Spring-loaded deflection plates close around the tree trunks and deflect detached fruit outwardly to interior surfaces of a pair of single-loop conveyors. Baffles cooperating with the interior of each conveyor restrains fruit therein as the conveyor passes overhead to an inverted position. Fruit is discharged from the conveyor elevated segment onto an output conveyor passing beneath the discharge area. The output conveyor includes a multi-segment, foldable conveyor frame over which a single conveyor belt is entrained. The conveyor belt may be folded over the harvester during non-harvesting transport. Canopy-impacting tines function as fruit detachment devices, and are rotatably driven in a single plane with both constant rotational and oscillatory rotational components of motion. The constant component is synchronized with vehicle forward speed to permit unimpeded feeding of trees through the harvester. The superimposed oscillatory component causes tines to sharply impact tree canopies for detaching fruit therefrom. Both the amplitude and frequency of such impacting action may be varied.

However, these patents fail to describe an autonomous single or double row harvester which is easy to use and efficient. Further, these patents fail to describe an autonomous single or double row harvester which may provide real-time data to a user with respect to each specific plant harvested at the plant level.

SUMMARY OF THE INVENTION

A plant by plant harvester is provided. Depending on the use, the device may also be called a 'plant by plant small plot harvester'. The harvester may be an autonomous device capable of harvesting and analyzing single or double rows of crop spaced as narrow as six inches apart. Further, the harvester may harvest cops as close as one inch apart within the same row. The autonomous single or double row harvester has a main frame supported by a plurality of wheels and/or tracks. The single row harvester may have a first and a second guide unit which surrounds a single row of a crop and directs the single row of the crop into a sheller, picker, or grain/fruit separation unit. In an alternative embodiment of the device, the device may harvest two rows of crops at the same time. In that embodiment, the harvester has a third guide unit. A GPS or any other location positioning device having an antenna is secured to the top of the main frame and allows the harvester to be remotely controlled. As part of the separation process, a hopper, container or holding bin may, in real-time, calculate the weight of the separated products. A plurality of sensors may be located on or near the first and/or second guide unit which allows the harvester to, for example, capture data related to the crop at the single plant level. Further, the autonomous single or double row plot harvester may gauge the strain of the crop and sense cob or grain/seed/fruit separation release pressure.

An advantage of the present autonomous single or double row harvester is that the present device may have a plurality of sensors which, for example, collects data about the environment and the harvested plants in real-time. The information may relate to, for example: soil type, structure, compaction, micro-nutrients, moisture levels or contamination; plant root health and fertility, or even insect, mold or fungi infestation. Still further, the sensors may detect and/or weed pressures. A plate (a substitute for stripper plates) may have a combination of a strain gauge and an impact sensor. Between them, they may give the user an approximation of the mass that strikes the plate and the force necessary to separate, for example, the ear from the stalk.

And another advantage of the present autonomous single or double row harvester is that the device may have movable guide units which may shift in and out to accommodate crops of various sizes.

In an embodiment, the present autonomous single or double row harvester may have a hopper located in a position other than the back of the device.

Yet another advantage of the present autonomous single or double row harvester is that the present device may capture data at the single plant level related to the traits or properties of a specific plant.

Still another advantage of the present autonomous single or double row harvester is that the present apparatus may utilize GPS or any other location positioning devices and or geo-tagging capabilities.

And another advantage of the present autonomous single or double row harvester is that the present apparatus may have a strain gauge at the front of the apparatus which may detect the amount of pressure needed to remove, for example, corn from a stalk.

Yet another advantage of the present autonomous single or double row harvester is that the present apparatus may have optical and/or infrared cameras which may capture plant data as well as environmental and ground conditions (such as the presence of fungi, mold and/or pests).

Still another advantage of the present autonomous single or double row harvester is that the present apparatus may have a mechanism which may harvest and separate the ears and/or grain/fruit from a plant structure. For example, an ear of corn may be shucked and shelled by the device. Further, corn cob and kernels may be handled and retained as separate communities while the corn stock is kept intact for other uses.

And another advantage of the present autonomous single or double row harvester is that the present apparatus may be able to weigh, test for moisture and even check for sample quality/damage a crop which is being harvested.

An advantage of the present autonomous single or double row harvester is that the present apparatus may be able to tag and bag an individual crop, such as a single ear of corn.

Yet another advantage of the present autonomous single or double row harvester is that the present apparatus may have an optional driver seat and/or remote controls which allow an operator to walk beside the apparatus and to control the apparatus remotely.

Still another advantage of the present autonomous single or double row harvester is that the present device may have additional sensors which may: detect the timing of contact of the apparatus to different portions of the same plant (ie: the top and bottom of an ear of corn); the strain gauge needed at the stripper plate to dislodge the ear of corn from the stalk; the length, diameter and shape and weight of each ear of corn; moisture content of the crop.

For a more complete understanding of the above listed features and advantages of the present autonomous single or double row harvester reference should be made to the detailed description and the drawings. Further, additional features and advantages of the invention are described in, and will be apparent from, the detailed description of the preferred embodiments.

DETAILED DESCRIPTION

A plant by plant harvester is provided. Depending on the use, the device may also be called a 'plant by plant small plot harvester'. The harvester may be an autonomous device capable of harvesting and analyzing single or double rows of crop spaced as narrow as six inches apart. Further, the harvester may harvest cops as close as one inch apart within the same row. The autonomous single or double row harvester has a main frame supported by a plurality of wheels and/or tracks. The single row harvester may have a first and a second guide unit which surrounds a single row of a crop and directs the single row of the crop into a sheller, picker, or grain/fruit separation unit. In an alternative embodiment of the device, the device may harvest two rows of crops at the same time. In that embodiment, the harvester has a third guide unit. A GPS or any other location positioning device having an antenna is secured to the top of the main frame and allows the harvester to be remotely controlled. As part of the separation process, a hopper, container or holding bin may, in real-time, calculate the weight of the separated products. A plurality of sensors may be located on or near the first and/or second guide unit which allows the harvester to, for example, capture data related to the crop at the single plant level. Further, the autonomous single or double row plot harvester may gauge the strain of the crop and sense cob or grain/seed/fruit separation release pressure.

Figure 1:
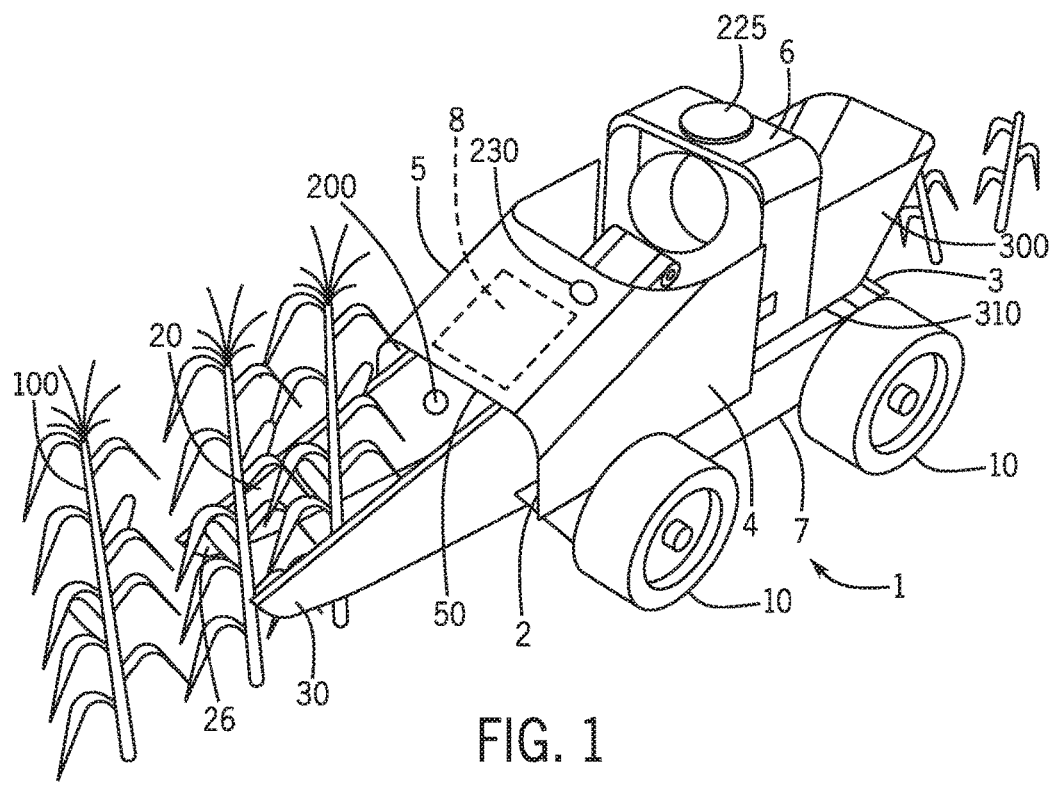
FIG. 1 illustrates a perspective view of the autonomous single row harvester.

Referring first to FIG. 1, in an embodiment, an autonomous single row harvester 1 is provided. (FIGS. 4 and 5 below illustrate the alternative embodiment of the harvester 1 wherein three guide units are utilized for processing two rows of crop at the same time.) However, first addressing the single row harvester, the autonomous single row harvester 1 may have a front 2, a back 3, a first side 4, a second side 5, a top 6, a bottom 7 and an interior 8. In an embodiment, the harvester 1 may have a plurality of wheels or tracks 10. Although the figures mostly illustrate the embodiment with only wheels being utilized, the device 1 may alternatively utilize a track 460 (FIG. 5) similar to a tank instead of standard wheels.

Further, FIG. 1 illustrates the harvester 1 having four wheels 10; however it should be understood that the harvester 1 may have more or a fewer number of wheels 10. In an embodiment, the apparatus 1 may have a main processing opening 50 located at the front 2 of the apparatus 1 wherein the main processing opening 50 may receive and process a single crop 100 as the apparatus 1 moves forward. More specifically, the opening 50 may receive the crop 100 as it passes into the interior 8 of the device 1. FIG. 1 illustrates the crop 100 as a stalk of corn, but it should be understood that the crop 100 may be any suitable crop 100 which may be individually harvested by the apparatus 1.

Figure 2:
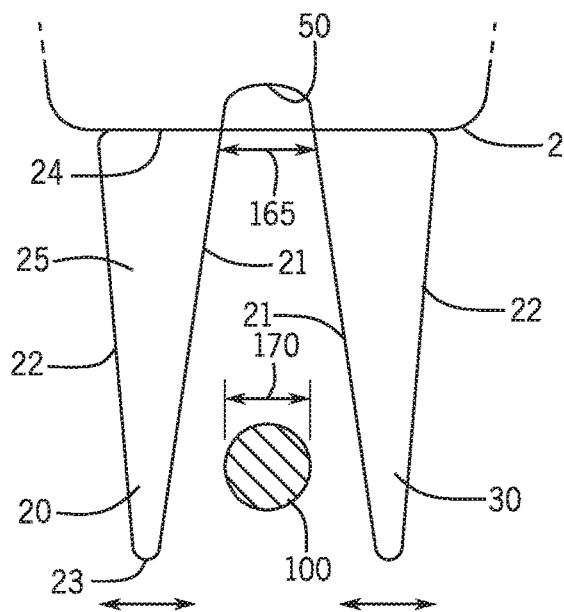
FIG. 2 illustrates a top view of the first guide unit and the second guide unit of the autonomous single row harvester.

Referring now to FIG. 2, in an embodiment, located at the front 2 of the harvester 1 may be a first guide unit 20 and a second guide unit 30. The second guide unit 30 may be a mirror image of the first guide unit 20 (and have corresponding similar numbers). The first guide unit 20 may be generally elongated having a curved or slanted first side 21 (the "interior side"), a second side 22 (the "exterior side"), a front 23, a back 24, a top 25 and a bottom 26 (FIG. 1). In an embodiment, the first side 21 of the first guide unit 20 and the first side 21 of the second guide unit 30 are curved while the second sides 22 (the exterior side) of the guide units 20, 30 are straight (therein the exterior sides are parallel to each other) so as to provide a wedge-shaped unit for pushing through the crop 100.

In an embodiment during use, the curved or slanted first side 21 of the first guide unit 20 and the curved or slanted first side 21 of the second guide unit 30 together may surround the crop 100 and may direct the crop 100 into the main processing opening 50 of the front 2 of the autonomous single row harvester 1. The main processing opening 50 of the apparatus 1 may, for example, cut the crop 100 and, for example, shell the crop 100. In an embodiment, a blade (not shown) is located at the main processing opening 50.

A distance 165 (for example, near the main processing opening 50) may separate the first guide unit 20 and the second guide unit 30. The distance 165 may be, for example, slightly larger than a width 170 of a standard crop 100 which is being processed by the apparatus 1. As a result, the apparatus 1 may be used to process a single crop 100 at a time. In an embodiment, the first guide unit 20 and the second guide unit 30 may move inward (toward each other) or away from each other so that a user may set the distance 165 between the two guide units 20, 30 depending on the crop 100 to be processed and or based on the growth of the crop 100. More specifically, if a crop 100 is to be processed earlier in the season than normal, the first guide unit 20 and the second guide unit 30 may be brought in toward each other (therein reducing the length of 165) so that only a single plant of the crop 100 is processed at a time. The first guide unit 20 and/or the second guide unit 30 may move in a generally horizontal manner with respect to the ground.

If the user desires to wait until the crop 100 is grown larger, the user may move the first guide unit 20 father away from the second guide unit 30 therein increasing the distance 165 to accommodate a larger, but still single, crop 100. Further, the user may alter the distance 165 between the first guide unit 20 and the second guide unit 30 depending on if the user is processing, for example, a stalk of corn or wheat.

FIG. 2, illustrates the first guide unit 20 and the second guide unit 30 moving closer together or farther apart. A user may manually or electronically move the first guide unit 20 and second guide unit 30 toward or away from each other.

In an embodiment, the apparatus 1 may have a plurality of sensors 200. In particular, the sensors 200 may be located on or near the curved or slanted first side 21 of the first guide unit 20 and/or the curved or slanted first side 21 of the second guide unit 30. In addition to, or alternatively, the sensors 200 may be located near the main processing opening 50. The sensors 200 may, for example, detect the pressure needed to cut the crop 100. As a result of sensing the pressure needed to cut the crop 100, a user may be able to determine valuable real-time information such as if processing the crop 100 needs to wait until the crop 100 matures. A plate (a substitute for stripper plates) may have a combination of a strain gauge and an impact sensor. Between them, they may give the user an approximation of the mass that strikes the plate and the force necessary to separate, for example, the ear from the stalk. Alternative sensors 200 may detect soil type, structure, compaction, micro-nutrients, moisture levels or contamination; plant root health and fertility, or even insect, mold or fungi infestation. Still further, the sensors 200 may detect and/or weed pressures. A plate (a substitute for stripper plates) may have a combination of a strain gauge and an impact.

In an embodiment, optical and/or infrared cameras 230 may be located on the apparatus 1. The optical and/or infrared cameras 230 may capture real-time visual crop 100 data for analysis by a user located in a remote location. In an embodiment, a global positioning system device GPS or any other location positioning device 225 may be located on the apparatus 1. In particular, the GPS or any other location positioning device 225 may be located on the top 6 of the device 1 and may allow for real-time adjusting of the movement of the apparatus 1.

In an embodiment, the apparatus 1 may have a hopper, container or holding bin 300 located on the main body of the apparatus 1. The hopper, container or holding bin 300 may receive the crop 100 once processed through the main body of the apparatus 1. The hopper, container or holding bin 300 on the main body 1 may further have a scale 310 which allows for the real-time weighing of the processed crop 100. In yet another embodiment, the apparatus 1 may have a bundling mechanism (not shown) which bags and tags the processed crop 100. A wireless communication means (such as a computer) may report the weight and other data collected from the sensors 200 to a remote location for real-time analysis.

Figure 3:
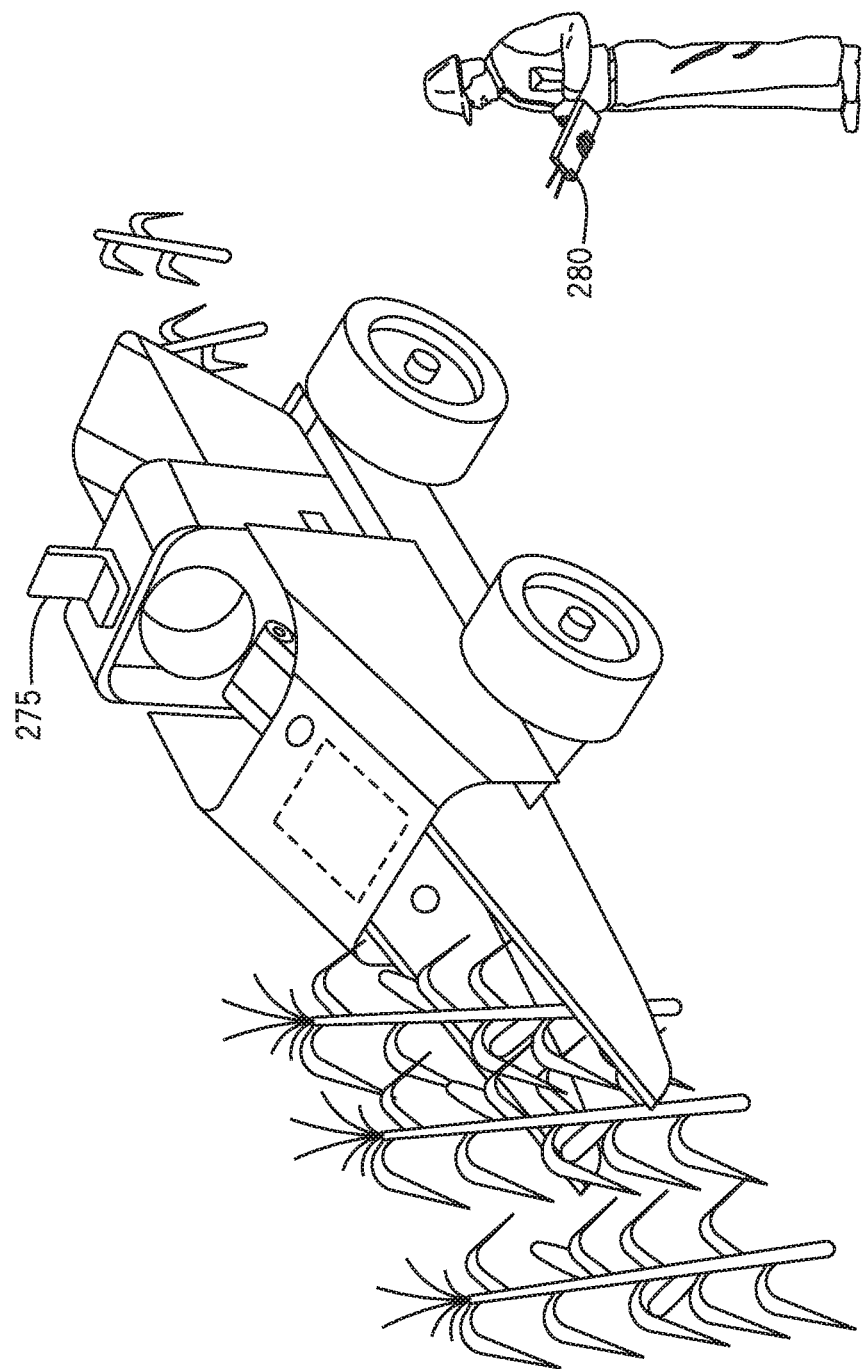
FIG. 3 illustrates an alternative embodiment of the autonomous single row harvester wherein the harvester has a driver seat for manually operating the harvester and a remote control for walk along control of the apparatus.

Referring now to FIG. 3, in an alternative embodiment, the apparatus 1 may have a seat 275 for a driver. In particular, in the embodiment wherein the apparatus 1 is manually controlled, a driver may override an automatic driving system to manually control the apparatus 1. Still further, in an alternative embodiment, an operator may merely walk along side of the apparatus 1 and may control the apparatus 1 by, for example, utilizing a remote control 280. Yet in another embodiment, the device 1 may be controlled autonomously by computer.

Figure 4:
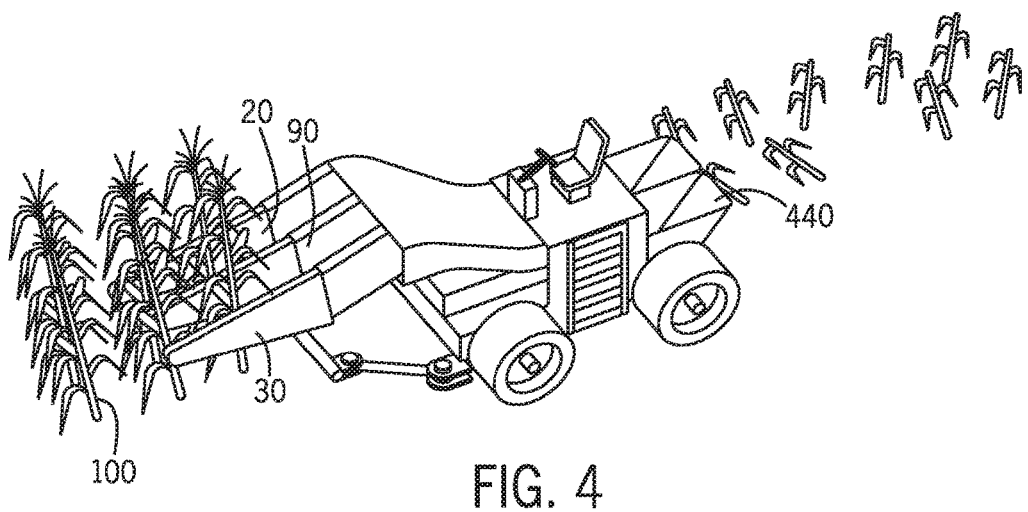
FIG. 4 illustrates an alternative embodiment of the autonomous harvester wherein the device harvests two rows of crop at the same time and wherein the device has a sorting and packing mechanism secured to the device.
Figure 5:
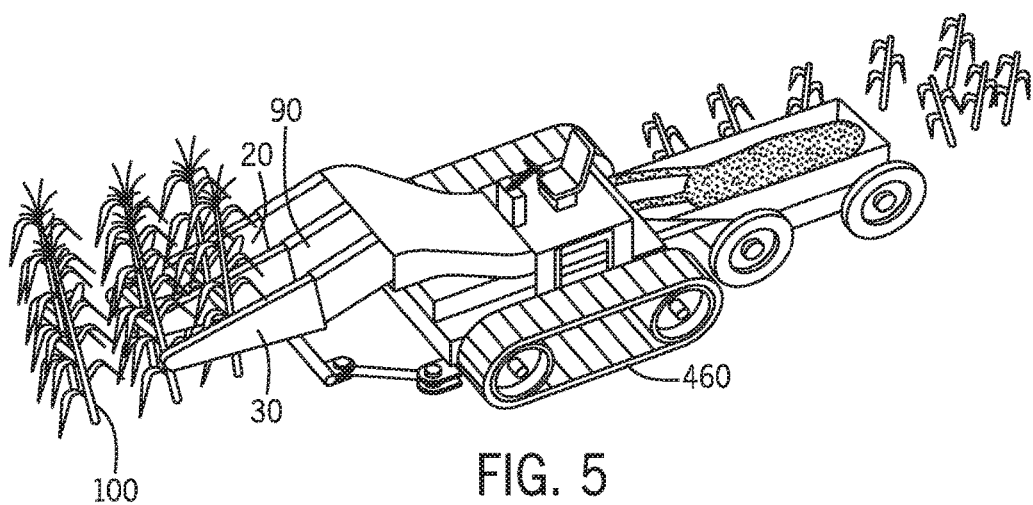
FIG. 5 illustrates an alternative embodiment of the autonomous harvester wherein the device harvests two rows of crop at the same time and wherein the device has a multi-channel in-line sheller, picker, or grain/fruit separation unit secured to the device and further wherein the device utilizes a track instead of wheels.

Referring now to FIGS. 4 and 5, in an alternative embodiment, the harvester 1 may have a third guide unit 90. The harvester 1 having the third guide 90 unit may have substantially the same features and functions as the harvester having two guide units except with the additional of the third guide unit 90. The third guide unit 90 may allow the harvester 1 to process two rows of crop at the same time. The third guide unit 90, along with the first guide unit 20 and the second guide unit 30 may also shift inward or outward to adjust for the size of the crop being processed. In another embodiment, the third guide unit 90 may remain stationary and in the middle of the first guide unit 20 and the second guide unit 30 and wherein the first guide unit 20 and second guide unit 30 move with respect to the stationary central third guide unit 90. The guide units may move horizontally with respect to the ground.

In an embodiment, the first guide unit 20 may move a greater distance away from the stationary third guide unit 90 than the second guide unit 30 moves away from the third guide unit 90. Thus, the distances between the first guide unit 20 and the third guide unit 90 may be different from the distance between the second guide unit 30 and the third guide unit 90. This allows for the harvesting of two rows or crops 100 when the two rows of crop 100 are of different sizes.

In an embodiment, the back of the harvester 1 may have a multi-channel in-line sheller, picker, or grain/fruit separation unit 440. The multi-channel in-line sheller, picker, or grain/fruit separation unit 440 may individually and separately process the two rows of crop at the same time. Further, in an embodiment, the harvester 1 may have a flexible or segmented shoot which allows the operator to adjust the machine depending on the height of the crop being processed. In particular, the operator may adjust the height of the first guide unit 20, the second guide unit 30 and/or the third guide unit optimally and efficiently accommodate the location of, for example, an ear of corn being processed.

Figure 6:
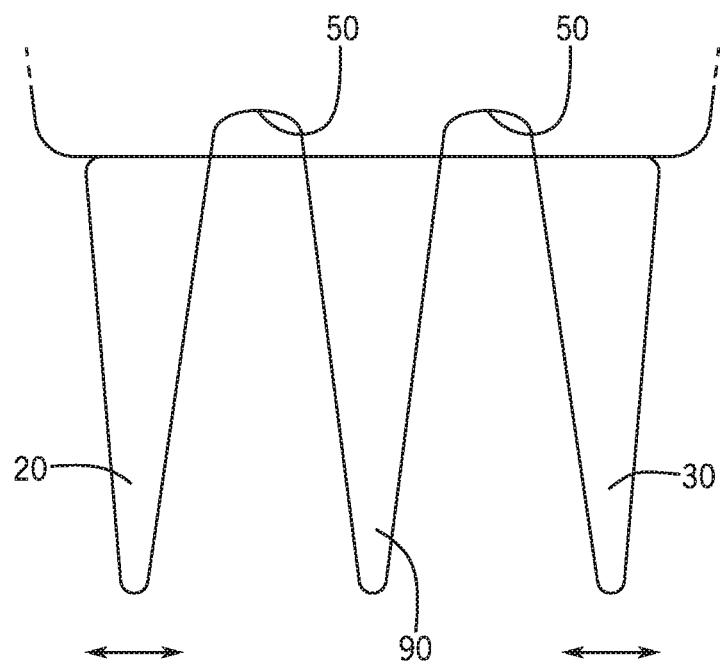
FIG. 6 illustrates a top view of an alternative embodiment wherein the first guide unit and the second guide unit move with respect to a stationary central third guide unit.

In still another embodiment, there may be multiple guide units. In particular, FIGS. 4-6 illustrate the device having three guide units (one stationary and two movable). In an alternative embodiment, the device 1 may have more than three guide units. In this embodiment, each of the guide units may move or may be stationary. Further, in this embodiment, a single plant may be processed between any two of the guide units; wherein a separate opening 50 is located between any two guide units.

Although embodiments of the invention are shown and described therein, it should be understood that various changes and modifications to the presently preferred embodiments will be apparent to those skilled in the art. Such changes and modifications may be made without departing from the spirit and scope of the invention and without diminishing its attendant advantages.

The invention claimed is:

1. A plant by plant harvester of comprising:
a main frame unit having a front, a back, a first side, a second side, a top, a bottom and a generally hollow interior;
a first elongated guide unit and a second elongated guide unit wherein the first elongated guide unit has a first end and a second end and wherein the second elongated guide unit has a first end and a second end;
a third elongated guide unit wherein the third elongated guide unit is located between the first elongated guide unit and the second elongated unit;
a first opening on the main frame unit at the front of the main frame unit wherein the first opening is located between the first elongated guide unit and the third elongated guide unit;
a second opening on the main frame unit at the front of the main frame unit wherein the second opening is located between the second elongated guide unit and the third guide unit;
wherein the first opening and the second opening of the main frame unit each receives an individual crop;
wherein the first elongated guide unit and the second elongated guide unit direct the individual crop into the interior of the main frame unit;
wherein the first elongated guide unit and/or second elongated guide unit moves horizontally with respect to the main frame;
wherein the second end of the first elongated guide unit and the second end of the second elongated guide unit are both directly connected to the main frame; and
wherein the first end of the first elongated guide unit moves in the same direction and the same distance as the second end of the first elongated guide unit and wherein the first end of the second elongated guide unit moves in the same direction and the same distance as the second end of the second elongated guide unit when the first elongated guide unit and the second elongated guide unit move horizontally with respect to the main frame.

2. The plant by plant harvester of claim 1 further comprising:
a curved interior side of the first elongated guide unit or the second elongated guide unit.

3. The plant by plant harvester of claim 1 further comprising:
an optical and/or infrared camera located on the main frame unit wherein the optical and/or infrared came is capable of capturing plant data as well as environmental and ground conditions.

4. The plant by plant harvester of claim 1 further comprising:
a plurality of wheels secured to the main frame unit wherein the plurality of wheels are located within a track and wherein the track directly contacts the ground and moves the harvester.

5. The plant by plant harvester of claim 1 wherein the harvester is autonomous.

6. The plant by plant harvester of claim 1 further comprising:
a multi-channel in-line sheller, picker, or grain/fruit separation unit located on the main frame unit.

7. The plant by plant harvester of claim 1 further comprising:
a plurality of wheels secured to the main frame unit.

8. The plant by plant harvester of claim 1 further comprising:
a seat for manually operating the harvester located on the main frame unit.

* * * * *